Patented Nov. 29, 1949

2,490,002

UNITED STATES PATENT OFFICE 2,490,002

RUBBERLIKE CURED POLYESTER-POLY-AMIDES AND PROCESS OF PRODUCING SAME

David W. Jayne, Jr., Old Greenwich, Harold M. Day, Cos Cob, and Edward L. Kropa, Old Greenwich, Conn., assignors to American Cyanamid Company, New York, N. Y., a corporation of Maine No Drawing. Application December 18, 1946, Serial No. 717,086

6 Claims. (Cl. 260—78)

This invention relates to high molecular weight polyester-polyamides and more specifically, to co-condensation products of linear polyester-polyamides with alpha,beta-unsaturated aliphtatic dicarboxylic acids.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound are described in the art as, for example, in Patent No. 2,363,581.

Linear polyamides of high molecular weight such as the well-known nylon may be prepared from aminocarboxylic acids or from polyamines and dicarboxylic acids and are described, for example, in Patents Nos. 2,071,250, 2,130,523 and others.

In our copending applications, Serial Nos. 717,089 and 717,090, filed Dec. 18, 1946, leather-like cross-linked polyester-polyamides obtained by bringing about reaction between a polyfunctional compound and a linear polyester-polyamide derived from a primary straight-chain monoalkylolamine and a saturated dicarboxylic acid are described and claimed. These leather-like materials can be readily cold-drawn or calendered, and they can be molded under heat and pressure.

It is an object of the present invention to prepare derivatives of linear polyester-polyamides obtained by reaction of dicarboxylic acids with monoalkylolamines, said derivatives being rubber-like materials.

It is another object of the present invention to bring about reaction between an alpha,beta-unsaturated aliphatic dicarboxylic acid and a linear polyester-polyamide to effect cross-linking of the latter.

Another object of the present invention is the preparation of a high molecular weight cross-linked polyester-polyamide which can be milled like rubber with pigments and curing agents and then cured in a rubber mold under heat and pressure to give a vulcanized material with rubber-like properties.

A still further object of the present invention is to provide a process for producing resins which can be cured by heating in the presence of an organic peroxide catalyst to produce a rubber-like material.

These and other objects are attained by bringing about reaction between 2-amino-1-butanol, alone or in admixture with other monoalkylolamines, and a saturated aliphatic dicarboxylic acid which does not form an anhydride upon heating, and then bringing about reaction between the product obtained and an alpha,beta-unsaturated aliphatic dicarboxylic acid. Substantially equivalent proportions of total acid and total alkylolamine are used, the molar ratio of saturated acid to unsaturated acid ranges from about 75:25 to 95:5 and that of the 2-amino-1-butanol to other alkylolamines, from 100:0 to 30:70. The reaction product is then milled with a pigment, other filler if desired, and peroxide curing catalyst, and cured by heating.

The invention will be described in greater detail in conjunction with the following specific examples in which the proportions are given in parts by weight. The invention should not be limited to the details set forth in the examples since they are merely illustrative.

Example 1

172 parts of sebacic acid (0.85 mol)
35.6 parts of 2-amino-1-butanol (0.4 mol)
36.6 parts of monoethanolamine (0.6 mol)
17.4 parts of fumaric acid (0.15 mol)

The sebacic acid, 2-amino-1-butanol and monoethanolamine are placed in a suitable vessel and heated to 200° C. While agitating with a stream of carbon dioxide, the mixture is maintained at 200° C. for 18 hours whereupon the fumaric acid is added and heating continued for 1 hour.

The viscous syrup is poured into a shallow tray and heated in a vacuum oven at 160° C. for one-half hour.

50 parts of the resin obtained are milled with 75 parts of Mapico Red No. 297, an iron oxide pigment, until the pigment is thoroughly dispersed. 3 parts of lauroyl peroxide are then added, and the milling is continued until the peroxide is also thoroughly dispersed. Cold water is passed through the rolls during the entire milling operation.

The milled stock is removed from the rolls as a sheet and is cured in a single cavity, stainless steel flash mold for 15 minutes at 500 lbs./in.$^2$ at 120° C. The cured sheet is leathery in appearance.

Example 2

172 parts of sebacic acid (0.85 mol)
31.2 parts of 2-amino-1-butanol (0.35 mol)
39.6 parts of monoethanolamine (0.65 mol)
17.4 parts of fumaric acid (0.15 mol)

The above ingredients are combined according to the procedure of Example 1, the three pre-milling heating periods being 18 hours, ¾ hour and one hour, respectively.

After milling with either 2% or 4% lauroyl peroxide, a cured resin sheet which is leathery in appearance is obtained.

Example 3

172 parts of sebacic acid (0.85 mol)
27.4 parts of 2-amino-1-butanol (0.31 mol)
39.2 parts of monoethanolamine (0.64 mol)
23.2 parts of fumaric acid (0.2 mol)

The procedure of Example 1 is followed, the third pre-milling heating period being omitted and the first two being 18 hours and 1¾ hours, respectively.

Upon milling with pigment and 2% by weight of the resin of benzoyl peroxide and molding, a sheet of cured resin which is leathery in appearance is obtained.

Example 4

182 parts of sebacic acid (0.9 mol)
39 parts of 2-amino-1-butanol (1.0 mol)
11.6 parts of fumaric acid (0.1 mol)

The sebacic acid and 2-amino-1-butanol are placed in a vessel, heated to 200° C. and held at this temperature for 18 hours. The fumaric acid is then added and heating continued for 2¼ hours. During both periods of heating the reaction mixture is agitated with a stream of carbon dioxide gas.

The viscous resin is poured into a shallow tray and heated in a vacuum oven at 160° C. for 7 hours.

50 parts of the cured resin is milled with 75 parts of Mapico Red No. 297, an iron oxide pigment, until the pigment is thoroughly dispersed. 3 parts of lauroyl peroxide are then added and the milling is continued until the peroxide is also thoroughly dispersed. Cold water is passed through the rolls during the entire milling operation.

The milled stock is removed from the rolls as a sheet and is cured in a single cavity, stainless steel flash mold for 15 minutes at 500 lbs./in.² at 120° C. The cured sheet is rubbery.

Example 5

190 parts of sebacic acid (0.94 mol)
43.2 parts of 2-amino-1-butanol (0.49 mol)
29.6 parts of monoethanolamine (0.49 mol)
3 parts of diethanolamine (0.03 mol)
7 parts of fumaric acid (0.06 mol)

The sebacic acid, 2-amino-1-butanol, and monoethanolamine are heated at 200° C. for 20 hours. The diethanolamine and fumaric acid are then added and heating is continued for one hour, all according to the procedure of Example 4.

The resin is cured in a vacuum oven at 160° C. for 12½ hours and 50 parts of the cured resin are milled with 75 parts of Mapico Red No. 297, an iron oxide pigment, and 3 parts of lauroyl peroxide as in Example 1. The cured sheet is rubbery.

Example 6

182 parts of sebacic acid (0.9 mol)
44.5 parts of 2-amino-1-butanol (0.5 mol)
30.5 parts of monoethanolamine (0.5 mol)
11.6 parts of fumaric acid (0.1 mol)

The procedure of Example 4 is followed, the sebacic acid and two alkylolamines being heated for 18 hours, the fumaric acid-containing mixture for 2½ hours, and finally the resin being cured for 12½ hours.

It is then milled in the usual manner using 2 parts of benzoyl peroxide per 50 parts of resin as the curing catalyst. The cured sheet is rubbery.

Example 7

162 parts of sebacic acid (0.8 mol)
44.5 parts of 2-amino-1-butanol (0.5 mol)
30.5 parts of monoethanolamine (0.5 mol)
23.2 parts of maleic acid (0.2 mol)

The sebacic acid, 2-amino-1-butanol and monoethanolamine are heated with agitation by carbon dioxide at 200° C. for 19 hours. The maleic acid is then added and heating continued under the same conditions for 1½ hours.

50 parts of the product, without additional heating, are milled with 75 parts of Mapico Red No. 297, an iron oxide pigment, and 1 part of lauroyl peroxide according to the procedure of Example 4. The cured sheet is rubbery.

Example 8

109.5 parts of adipic acid (0.75 mol)
31.2 parts of 2-amino-1-butanol (0.35 mol)
39.6 parts of monoethanolamine (0.65 mol)
29 parts of fumaric acid (0.25 mol)

The adipic acid, 2-amino-1-butanol and monoethanolamine are heated at 200° C. for 19 hours while agitation by means of a stream of carbon dioxide is provided. The fumaric acid is then added, and heating is continued for 1 hour.

100 parts of the resin obtained is milled first with 150 parts of Mapico Red No. 297, an iron oxide pigment, and then with 4 parts of lauroyl peroxide. The milled stock, when cured in a flash mold for 15 minutes at 120° C. and 500 lbs./in.² pressure, is converted into a sheet of rubbery material.

Example 9

172 parts of sebacic acid (0.85 mol)
34 parts of monoethanolamine (0.55 mol)
40 parts of 2-amino-1-butanol (0.45 mol)
17 parts of fumaric acid (0.15 mol)

The sebacic acid is heated together with the monoethanolamine and the 2-amino-1-butanol. The heating is carried out at about 200°–205° C. under a blanket of carbon dioxide gas for about 17 hours, after which the fumaric acid is added and the heating continued for an additional 2 hours.

The resulting condensation product is milled with about 150% of its weight of ferric oxide and about 6% of stearic acid peroxide. After compounding and sheeting, the resin is cured in a mold at about 120° C. for about 12 minutes under a pressure of about 500 lbs./in.². An elastic, rubber-like material is obtained.

Saturated aliphatic dicarboxylic acids which may be used in the present invention are those which do not form an anhydride upon heating. Acids having at least four carbon atoms between the two carboxyl groups are preferred. Examples of suitable acids are adipic acid, azelaic acid, sebacic acid, pimelic acid, brassylic acid, suberic acid, etc.

Monoalkylolamines which are suitable for admixture with 2-amino-1-butanol followed by condensation of the mixture with a saturated aliphatic dicarboxylic acid to form a linear polyester-polyamide susceptible of cross-linking include monoethanolamine, propanolamine, isopropanolamine, other monobutanolamines, 2-amino- 3-hexanol, 3-amino-4-heptanol, 2-amino-4-pentanol, 5-amino-4-octanol, 3-amino-3-methyl-2-butanol, 2-amino-2-methyl-3-hexanol, 2-amino-2-methyl-1-butanol, 3-amino-3-methyl-2-butanol, 3-amino-3-methyl-4-heptanol, 3-amino-2-methyl-4-heptanol, etc. Secondary amines such as N-alkyl, N-aryl and N-aralkyl monoalkylolamines may also be used. Examples are N-phenyl monoethanolamine, N-benzyl monoethanolamine, N-phenylethyl monoethanolamine, N-butyl monoethanolamine, N-methyl monoethanolamine, etc. Mixtures of two or more different monoalkylolamines may also be used, as evidenced by the foregoing examples.

Moreover, a small proportion of a polyfunctional (at least trifunctional) alkylolamine for example diethanolamine, polyamine for example diethylenetriamine, or polyhydric alcohol for example glycerol, may be incorporated in the reaction mixture.

Alpha,beta-unsaturated aliphatic dicarboxylic acids which are suitable for cross-linking of the linear polyester-polyamides include maleic acid, itaconic acid, fumaric acid, citraconic acid, etc. Corresponding acid anhydrides as, for example, maleic anhydride may also be used.

The resins of the present invention are preferably prepared in a two-stage process, both stages of which may be carried out at temperatures between about 180° and 220° C. and preferably at about 200° C. In order to avoid oxidation, we prefer carrying out the reaction in an inert atmosphere such as nitrogen, carbon dioxide, etc.

The resin obtained upon reaction of saturated aliphatic dicarboxylic acid, 2-amino-1-butanol, other monoalkylolamine if desired, and alpha,beta-unsaturated aliphatic dicarboxylic acid according to the process of the present invention can be cured by heating with a small amount of an organic peroxide. If the resin is milled on a rubber mill with an appropriate reinforcing pigment and peroxide curing agent, the milled stock can be cured under heat and pressure in a rubber mold to yield a strong and elastic rubber-like product. Since the resins cure rapidly at relatively low temperatures and therefore have a tendency to cure prematurely during milling or to "scorch" on the mill, it is desirable to utilize cooling water in the milling rolls.

The milled stock may be cured in a rubber mold at 90°–120° C. in 5–15 minutes at 500–1000 pounds pressure.

Examples of suitable curing catalysts include the acidic peroxides, for example, benzoyl peroxide, phthalic peroxide, succinic peroxide, benzoyl acetic peroxide; the fatty oil acid peroxides, for example, coconut oil acid peroxide, lauric peroxide, stearic peroxide; the alkyl peroxides, for example, tertiary butyl hydroperoxide; and the terpene peroxides, for example, ascaridole, etc. In general, the concentration of catalyst should be from about 1% to about 10% by weight of the resin.

It may be desirable to add a polymerization inhibitor to the resins of the present invention during their preparation to stabilize them and minimize the amount of scorching on the mill. Suitable inhibitors are for example, hydroquinone, benzaldehyde, resorcinol, tannin, formaldehyde, sym. alpha,beta-naphthyl-p-phenylene diamine, ascorbic acid, isoascorbic acid, etc., in an amount equivalent to about 0.1%–1% by weight of the total weight of reaction mixture.

It is preferable that acid and alcohol-amine reactants be employed in approximately stoichiometrically equivalent proportions, but a slight excess of one of the reactants does not necessarily do any harm. In order to obtain products of the desired properties, it is essential that proportions of the reactants be carefully controlled, and we have found that rubber-like products can be obtained by reacting the saturated aliphatic dicarboxylic acid, 2-amino-1-butanol, other monoalkylolamine if desired, and alpha,beta-unsaturated aliphatic dicarboxylic acid in a molar ratio of about 0.75:100:0:0.25 to 0.95:0.3:0.7:0.5.

The materials of the present invention closely resemble rubber, lacking its resilience and high tensile strength and elongation. However, they are superior to natural rubber in their gasoline, grease and oil resistance, their resistance to deterioration by actinic light, heat and/or air, and their relatively short time of cure. These and other properties put our new rubber-like products in the class of a specialty product. As such, they have many uses as substitutes for rubber in more or less static applications. Some of these include the fabrication of jar rings, shoe soles and heels, gaskets, special tubing, printing and typewriter rolls, etc. In addition, they find application in many industrial fields including laminating, coating, impregnating, etc. For example, the products of the present invention, before curing, may be used as textile or fabric impregnants to produce, after curing of the impregnated material, water-repellent products.

The resins of the present invention may be mixed with rubber whereupon they act not only as anti-oxidants, plasticizers and a means of lowering both the viscosity and the power required during milling, but also as vulcanization accelerators. They may be mixed with ester gum and various alkyd resins, particularly the oil-modified air-drying resins to produce lacquers, varnishes, enamels, etc. They may also be incorporated with phenol-formaldehyde resins, urea-formaldehyde resins, thiourea-formaldehyde resins, melamine-formaldehyde resins and other amino-aldehyde resins, either in solution or by admixture as solid resins.

Obviously, suitable fillers, dyes, and pigments may be mixed with the resins to modify the properties thereof as may be desirable. We have found that pigmenting of the resinous products of the present invention increases their tensile strength and any pigment may be incorporated with the resins to produce this effect. Some suitable pigments include iron oxides, carbon black, titanium dioxide, silicon dioxide, etc., as well as other pigments which are of suitable size to act as reinforcing pigments. Due to absorption of peroxide by carbon black, it is usually preferably used in admixture with other pigments.

Fillers other than pigments may also be incorporated with the resinous products of the present invention. These include wood flour, asbestos, calcium silicate, calcium carbonate, magnesium carbonate, talc, paper pulp, clay, glass filaments, mica, cotton flock, silica, etc.

When used in the present specification and claims, the term "rubber-like" is intended to cover products which may vary rather widely in appearance from rubbery to leathery but which have in common the following properties: the products are essentially thermoset and cross-linked chemically, their tensile strengths are increased by pigmenting, they cannot be readily reprocessed such as by calendering or remolding after they have become thermoset, and they can be cured by heating in the presence of an organic peroxide catalyst.

We claim:

1. A rubber-like product obtained by heating at about 180°–220° C. at least one monoalkylolamine of the formula HO—Y—NHR in which Y is a divalent saturated aliphatic hydrocarbon radical and R is selected from the group consisting of hydrogen and saturated hydrocarbon radicals and including 2-amino-1-butanol with an aliphatic saturated hydrocarbon dicarboxylic acid which does not form an anhydride upon heating, reacting the product so-obtained with an alpha,beta-unsaturated aliphatic hydrocarbon dicarboxylic acid, substantially equivalent proportions of total acid and total alkylolamine being used, the molar ratio of saturated acid to unsaturated acid being from 75:25 to 95:5 and that of 2-amino-1-butanol to other alkylolamines being from 100:0 to 30:70, and curing the reaction product by heating in the presence of an organic peroxide catalyst.

2. A rubber-like product obtained by heating at about 180°–220° C. at least one monoalkylolamine of the formula HO—Y—NHR in which Y is a divalent saturated aliphatic hydrocarbon radical and R is selected from the group consisting of hydrogen and saturated hydrocarbon radicals and including 2-amino-1-butanol with an aliphatic saturated hydrocarbon dicarboxylic acid which does not form an anhydride upon heating, reacting the product so obtained with an alpha,beta-unsaturated aliphatic hydrocarbon dicarboxylic acid, substantially equivalent proportions of total acid and total alkylolamine being used, the molar ratio of saturated acid to unsaturated acid being from 75:25 to 95:5 and that of 2-amino-1-butanol to other alkylolamines being from 100:0 to 30:70, milling the resin obtained with a pigment and an organic peroxide curing agent, and curing the milled resin by heating.

3. A rubber-like product obtained by heating at about 180°–220° C. a mixture containing 2-amino-1-butanol and monoethanolamine in molar proportions of from 0.3:0.7 to 0.5:0.5 with an aliphatic saturated hydrocarbon dicarboxylic acid which does not form an anhydride upon heating, heating the product so obtained with an alpha,beta-unsaturated aliphatic hydrocarbon dicarboxylic acid, substantially equivalent proportions of total acid and total alkylolamine being used, the molar ratio of saturated acid to unsaturated acid being from 75:25 to 95:5, milling the resin obtained with a pigment and an organic peroxide curing agent, and curing the milled resin by heating.

4. A rubber-like product obtained by heating at about 180°–220° C. 2-amino-1-butanol with an aliphatic saturated hydrocarbon dicarboxylic acid which does not form an anhydride upon heating, heating the product so obtained with an alpha,beta-unsaturated aliphatic hydrocarbon dicarboxylic acid, substantially equivalent proportions of total acid and 2-amino-1-butanol being used, the molar ratio of saturated acid to unsaturated acid being from 75:25 to 95:5, milling the resin obtained with a pigment and an organic peroxide curing agent, and curing the milled resin by heating.

5. A rubber-like product obtained by heating at about 180°–220° C. at least one alkylolamine of the formula HO—Y—NHR in which Y is a divalent saturated aliphatic hydrocarbon radical and R is selected from the group consisting of hydrogen and saturated hydrocarbon radicals and including 2-amino-1-butanol with sebacic acid, reacting the product so obtained with fumaric acid, substantially equivalent proportions of total acid and total alkylolamine being used, the molar ratio of sebacic acid to fumaric acid being from 75:25 to 95:5 and that of 2-amino-1-butanol to other alkylolamines being from 100:0 to 30:70, and then curing the reaction product by heating in the presence of an organic peroxide catalyst.

6. A process which comprises heating at about 180°–220° C. at least one alkylolamine of the formula HO—Y—NHR in which Y is a divalent saturated aliphatic hydrocarbon radical and R is selected from the group consisting of hydrogen and saturated hydrocarbon radicals and including 2-amino-1-butanol with an aliphatic saturated hydrocarbon dicarboxylic acid which does not form an anhydride upon heating, heating the reaction product obtained with an alpha,beta-unsaturated aliphatic hydrocarbon dicarboxylic acid, substantially equivalent proportions of total acid and total alkylolamine being used, the molar ratio of saturated acid to unsaturated acid being from 75:25 to 95:25 and that of 2-amino-1-butanol to other alkylolamines being from 100:0 to 30:70, milling the resin obtained with a pigment and an organic peroxide curing agent, and curing the milled product by heating.

DAVID W. JAYNE, Jr.
HAROLD M. DAY.
EDWARD L. KROPA.

REFERENCES CITED

The following references are of record in the file of this patent:

UNITED STATES PATENTS

| Number | Name | Date |
|---|---|---|
| 2,333,639 | Christ et al. | Nov. 9, 1943 |
| 2,363,581 | Frosch | Nov. 28, 1944 |
| 2,403,533 | Kaszuba | July 9, 1946 |
| 2,406,298 | King | Aug. 20, 1946 |